United States Patent
Sailer et al.

(10) Patent No.: US 11,087,393 B2
(45) Date of Patent: Aug. 10, 2021

(54) VEHICLE SHARING

(71) Applicant: Honda Motor Co., Ltd., Tokyo (JP)

(72) Inventors: Michael T. Sailer, Whittier, CA (US);
Katie C. Wallace, Long Beach, CA (US); Annika E Nordlund-Swenson, Seattle, WA (US); Alen Simon, La Crescenta, CA (US); James Keen, Thousand Oaks, CA (US); Spencer L. Mackay, Agoura Hills, CA (US); Kimberlee C. Muenzer, La Canada, CA (US); Takuya Idehara, Sherman Oaks, CA (US); David K. B. Lee, Glendale, CA (US)

(73) Assignee: Honda Motor Co., Ltd., Tokyo (JP)

( * ) Notice: Subject to any disclaimer, the term of this patent is extended or adjusted under 35 U.S.C. 154(b) by 158 days.

(21) Appl. No.: 16/369,370

(22) Filed: Mar. 29, 2019

(65) Prior Publication Data
US 2020/0311805 A1    Oct. 1, 2020

(51) Int. Cl.
G06Q 30/06    (2012.01)
G06Q 10/00    (2012.01)
G06Q 50/30    (2012.01)
G06Q 20/22    (2012.01)

(52) U.S. Cl.
CPC ......... *G06Q 30/0645* (2013.01); *G06Q 10/20* (2013.01); *G06Q 20/29* (2013.01); *G06Q 50/30* (2013.01)

(58) Field of Classification Search
CPC .... G06Q 50/30; G06Q 30/0645; G06Q 10/20; G06Q 20/29
See application file for complete search history.

(56) References Cited

U.S. PATENT DOCUMENTS

| 4,852,000 A * | 7/1989 | Webb ............... G06Q 40/02 705/30 |
| 8,244,549 B1 * | 8/2012 | Stener ............... G06Q 10/02 705/1.1 |
| 9,459,622 B2 | 10/2016 | Abhyanker |

(Continued)

FOREIGN PATENT DOCUMENTS

| CN | 107330758 A | 11/2017 |
| KR | 20060122988 A | 12/2006 |

OTHER PUBLICATIONS

Formulations for Optimal Shared Ownership and Use of Autonomous or Driverless Vehicles, Masoud and Jayakrishnan, Transportation Research Board 95th Annual Meeting, Jan. 12, 2016; https://trid.trb.org/view/1393683 (Year: 2016).*

(Continued)

*Primary Examiner* — Jeff Zimmerman
*Assistant Examiner* — Meibo W Chen
(74) *Attorney, Agent, or Firm* — American Honda Motor Co., Inc.; Aaron C. Fong

(57) ABSTRACT

The systems and methods provided herein are directed to a system for managing a jointly owned autonomous vehicle. The system schedules usage of the vehicle by different owners, makes the vehicle available for rental by third parties when not in use by the owners, and distributes expenses and rental revenue to owners proportional to each owner's ownership interest or in accordance with user behavior and vehicle usage, as appropriate.

13 Claims, 6 Drawing Sheets

| | Sunday | Monday | Tuesday | Wednesday |
|---|---|---|---|---|
| | Rentals (home) | Rentals (home) | Rentals (home) | Rentals (home) |
| | | Alice: Home to work downtown | Alice: Home to work downtown | Alice: Home to work downtown |
| Alice: Brunch @ Pancake Palace | | | | |
| | | | | Service appointment |
| | Rentals (home) | Rentals (downtown) | Rentals (downtown) | |
| | | | | Rentals (uptown, downtown) |
| Cecil: Groceries | Alice: Work to home | Alice: Work to home | Alice: Work to home |
| | | Rentals (home) | | Cecil: Dinner @ Kale Buffet |
| | | Ben: Home to meeting midtown | | Alice: Home to downtown |
| | Rentals (home, airport) | Rentals (midtown) | | |
| | | Ben: Meeting to home | Rentals (home) | Rentals (downtown) |
| Ben: Airport to home | | | | |
| | Rentals (home) | Rentals (home) | | |
| | | | | Alice: Downtown to home |

(56) References Cited

U.S. PATENT DOCUMENTS

| | | | |
|---|---|---|---|
| 2005/0125148 A1* | 6/2005 | Van Buer | G01C 21/3617 |
| | | | 701/468 |
| 2007/0168304 A1* | 7/2007 | Hletko | G06Q 30/0283 |
| | | | 705/400 |
| 2008/0103657 A1* | 5/2008 | Norton | G06Q 40/12 |
| | | | 701/33.4 |
| 2011/0200017 A1* | 8/2011 | Amalfitano | H04W 28/24 |
| | | | 370/335 |
| 2011/0213629 A1* | 9/2011 | Clark | G06Q 10/02 |
| | | | 705/5 |
| 2011/0246404 A1* | 10/2011 | Lehmann | G06Q 50/14 |
| | | | 706/21 |
| 2015/0095197 A1* | 4/2015 | Eramian | G06Q 30/0284 |
| | | | 705/26.64 |
| 2015/0134481 A1 | 5/2015 | Glickfield et al. | |
| 2015/0278942 A1 | 10/2015 | Krishnamurthy et al. | |
| 2015/0294403 A1* | 10/2015 | Chu | G06Q 30/0645 |
| | | | 705/307 |
| 2015/0338852 A1* | 11/2015 | Ramanujam | G08G 1/202 |
| | | | 701/2 |
| 2016/0026935 A1* | 1/2016 | Botea | G06Q 10/02 |
| | | | 705/5 |
| 2016/0071082 A1* | 3/2016 | Driscoll | G06Q 20/145 |
| | | | 705/13 |
| 2016/0203435 A1* | 7/2016 | Waltniel | G06Q 10/063118 |
| | | | 705/7.17 |
| 2017/0098231 A1 | 4/2017 | Dietrich | |
| 2017/0364968 A1* | 12/2017 | Gopalakrishnan | |
| | | | G06Q 30/0283 |
| 2018/0060827 A1* | 3/2018 | Abbas | G05D 1/0285 |
| 2019/0035282 A1* | 1/2019 | Ferguson | G06N 20/00 |
| 2019/0295014 A1* | 9/2019 | Fagnant | G06Q 10/02 |

OTHER PUBLICATIONS

Masoud, Formulations for Optimal Shared Ownership and Use of Autonomous or Driverless Vehicles, Jan. 12, 2016 (Year: 2016).*

Fountain, Fractional Interests in Property, Nov. 1, 2016, https://www.thetaxadviser.com/issues/2016/nov/fractional-interests-in-property.html (Year: 2016).*

Huang, Developing effective service compensation strategies, Apr. 2011 (Year: 2011).*

Masoud, "Formulations for Optimal Shared Onwership and Use of Autonomous or Driverless Vehicles", Jan. 12, 2016 (Year: 2016).*

Fountain, "Fractional Interests in Property", Nov. 1, 2016 (confirmed via Wayback Machine), https://www.thetaxadviser.com/issues/2016/nov/fractional-interests-in-property.html (Year: 2016).*

Sampson, "Optimization of Vacation Timeshare Scheduling", Oct. 2008, Operations Research, vol. 56 No. 5 (Year: 2008).*

Torney Draft Order Algorithm, Oct. 19, 2017 (confirmed via Wayback Machine), https://torney.splitseasontickets.com/about (Year: 2017).*

* cited by examiner

200

| Trip user | Tank before trip | Tank after trip |
|---|---|---|
| Alice | 16.3 gal | 15.2 gal |
| Ben | 15.2 gal | 11.5 gal |
| Rentals | 11.5 gal | 8.1 gal |
| Alice | 8.1 gal | 5.3 gal |
| Rentals | 5.3 gal | 2.1 gal |
| Cecil | 2.1 gal | 1.2 gal |

| Event:    | Fueling                   |
|-----------|---------------------------|
| Location: | Acme Gas, 1234 Main St.   |
| Date:     | 03-05-2018                |
| Time:     | 17:05                     |
| Gallons:  | 14.0                      |
| Cost:     | $34.72                    |
| Paid by:  | Cecil                     |

*210*

Alice
| Personal:     | 3.9 gal  |
|---------------|----------|
| Rental (60%): | 4.0 gal  |
| Total gas:    | 7.9 gal  |
| Balance:      | -$18.17  |

*220a*

Ben
| Personal:     | 3.7 gal  |
|---------------|----------|
| Rental (30%): | 2.0 gal  |
| Total gas:    | 5.7 gal  |
| Balance:      | -$13.11  |

*220b*

Cecil
| Personal:     | 0.9 gal  |
|---------------|----------|
| Rental (10%): | 0.7 gal  |
| Total gas:    | 1.6 gal  |
| Balance:      | $34.12   |
|               | - $ 3.68 |
|               | = $30.44 |

| Alice – August 20xx | |
|---|---|
| Debits: | -$325.24 |
| Personal gas: | -$150.88 |
| Rental gas (60%): | -$123.67 |
| Oil change (60%): | -$ 50.69 |
| | |
| Credits: | $1,529.71 |
| Rental income (60%): | $1,350.42 |
| Gas bought: | $94.81 |
| Oil change: | $84.48 |
| | |
| Balance: | $1204.47 |

Fig. 3

| Sunday | Monday | Tuesday | Wednesday |
|---|---|---|---|
| Rentals (home) | Rentals (home) | Rentals (home) | Rentals (home) |
| Alice: Brunch @ Pancake Palace | Alice: Home to work downtown | Alice: Home to work downtown | Alice: Home to work downtown |
| Rentals (home) | Rentals (downtown) | Rentals (downtown) | Service appointment |
| | | | Rentals (uptown, downtown) |
| Cecil: Groceries | Alice: Work to home | Alice: Work to home | Alice: Work to home |
| | | | Cecil: Dinner @ Kale Buffet |
| | Ben: Home to meeting midtown | | Alice: Home to downtown |
| Rentals (home, airport) | Rentals (midtown) | Rentals (home) | Rentals (downtown) |
| | Ben: Meeting to home | | |
| Ben: Airport to home | Rentals (home) | | |
| Rentals (home) | | | Alice: Downtown to home |

VEHICLE SHARING

BACKGROUND AND BRIEF DESCRIPTION

The advent of autonomous vehicles provides additional options for the use of valuable assets in order to recover portions of their value, in what is often referred to as the "sharing economy." One discussion of value optimization is the ability of autonomous vehicles to be rented to third parties when they are not being used by their owners.

The present disclosure describes methods and apparatus for managing joint ownership of a vehicle by multiple owners, as well as providing for the fair distribution of revenue received from the rental of the vehicle by third parties. Aspects of the disclosure are directed towards mechanisms to incentivize owners to take necessary vehicular actions such as maintenance, and allow for situations in which different owners may have different ownership interests—for example, have contributed different investment amounts—in the vehicle.

According to aspects of one exemplary embodiment, a computer-implemented method includes allocating fractional ownership interests of an autonomous vehicle to each of a plurality of owners; determining the availability of the autonomous vehicle for rental; managing the rental of the vehicle by a third party, the rental including the third party providing payment for the rental; and allocating the provided payment amongst the plurality of owners based on the fractional ownership interests.

In some embodiments, the method can also include identifying an expense associated with the vehicle; and allocating the expense amongst the plurality of owners based on the fractional ownership interests.

In some embodiments, the method can also include receiving vehicle usage requests from the plurality of owners; and managing use of the autonomous vehicle by the plurality of owners in response to the vehicle usage requests by assigning priority to the requests. The priority can be based on the fractional ownership interests.

In some embodiments, the method can also include determining that a user has performed a maintenance task on the vehicle; and providing a vehicle usage benefit to the user based the performance of the maintenance task.

In some embodiments, the method can also include tracking usage of the vehicle by each of the plurality of owners; identifying an expense associated with the vehicle; and allocating the expense amongst the plurality of owners based on tracked usage. The expense may be fuel for operating the vehicle.

In some embodiments, determining the availability of the autonomous vehicle for rental can include receiving a request for rental by the third party, the request including a time and a destination; comparing the request to scheduled usage of the vehicle by the plurality of owners; determining that time of the request for rental does not conflict with the scheduled usage; and determining that the destination of the request for rental allows sufficient time for the vehicle to travel from the destination to carry out the scheduled usage.

In some embodiments, a fractional ownership interest of a first owner of the plurality of owners is greater than the fractional ownership interest of a second owner. Based on the first owner's greater ownership interest, the method can further include collecting a larger portion of a vehicle expense from the first owner; and allocating a larger portion of the provided payment to the first owner.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing FIGURES are not necessarily drawn to scale and certain FIGURES can be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

FIG. 2A is a table of fuel use in accordance with one aspect of the present disclosure;

FIG. 2B illustrates allocation of the expense of fuel in accordance with one aspect of the present disclosure;

FIG. 3 is a monthly statement for an owner in accordance with one aspect of the present disclosure;

FIG. 5 is a vehicle usage schedule in accordance with one aspect of the present disclosure.

DESCRIPTION OF THE DISCLOSURE

The description set forth below in connection with the appended drawings is intended as a description of exemplary embodiments of the disclosure and is not intended to represent the only forms in which the present disclosure can be constructed and/or utilized. The description sets forth the functions and the sequence of blocks for constructing and operating the disclosure in connection with the illustrated embodiments. It is to be understood, however, that the same or equivalent functions and sequences can be accomplished by different embodiments that are also intended to be encompassed within the spirit and scope of this disclosure.

Generally described, the systems and methods herein are directed to managing the use of an autonomous vehicle having multiple owners. Scheduled and unscheduled trips by owners are balanced against revenue-generating activities in which the vehicle is used by non-owners. Because fractional ownership may be unequal, ownership responsibilities and benefits can be allocated proportional to ownership.

Figure 1:
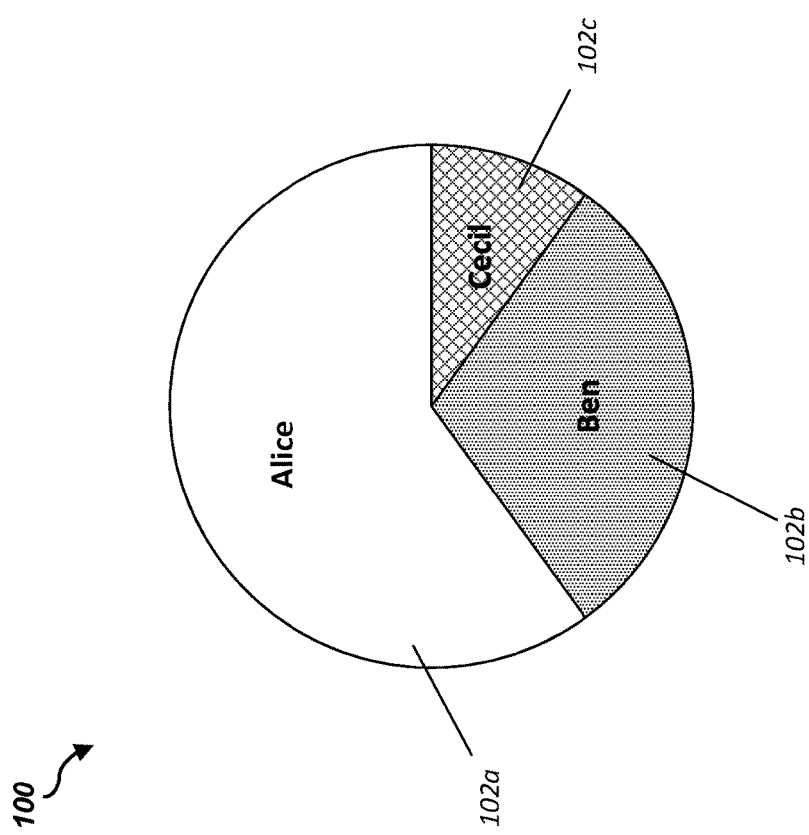
FIG. 1 is a pie chart showing shared ownership of a vehicle in accordance with one aspect of the present disclosure.

FIG. 1 is a pie chart 100 illustrating shared ownership of an autonomous vehicle. Three roommates, Alice, Ben, and Cecil, are shown having shares of different sizes. Alice owns the largest share 102a of 60%, Ben the second largest share 102b of 30%, and Cecil the smallest share 102c of 10%.

In some implementations of the present invention, the share size (which may be determined by, for example, initial or ongoing capitalization of the vehicle sale or lease price, or any other method agreed-upon by the owners) may determine the relative allocation of expenses and/or revenues for various vehicle activities.

For example, because Alice owns 60% of the vehicle, she may be due 60% of the revenue (net service or other fees external to the ownership group) from third-party rental of the vehicle at times it is not at use by owners. Alice may also be responsible for 60% of maintenance expenses for the vehicle, such as oil changes, tire rotations, and repairs. Alice may also be responsible for paying 60% of the cost of fuel expended when the vehicle is rented. Other regular expenses associated with general use of the vehicle, such as a monthly parking or garage fee, may also be allocated in this way.

In contrast to shared expenses, some expenses associated with the vehicle may not be shared according to ownership proportion, but may be instead be allocated according to usage. FIGS. 2A and 2B provide an example of this.

The table 200 shown in FIG. 2A represents the trips taken in the shared vehicle between one fueling event and the next. As shown in the first column 202 indicating the vehicle's user for each trip, each vehicle owner took the vehicle for at least one trip. Vehicle rentals were also responsible for some of the trips. Columns 204 and 206 respectively show the starting and ending measurements for the amount of fuel remaining in the vehicle's tank. The very last measurement shown in the last column 206, although marked as the condition of the tank after the trip, in fact represents the last measurement made prior to Cecil refueling the vehicle.

FIG. 2B shows an event record 210 associated with Cecil's refilling of the vehicle on his trip. Cecil paid $34.72 to put 14 gallons in the tank. Event notices 220a-c are generated in response to the event record 210, indicating what is owed or credited to each owner from the fueling event.

From the table 200 of FIG. 2A, the system calculates that Alice's trips totaled 3.9 gallons. Ben used 3.7 gallons, Cecil used 0.9 gallons, and 6.6 gallons of fuel were used during rental of the vehicle by third parties. Based on these numbers, Alice is charged for the cost of her personal fuel plus 60% of the rental fuel. Similarly, Ben and Cecil are each charged the cost of their personal fuel plus 30% and 10% of the rental fuel, respectively. Finally, Cecil buying the gas is credited against the joint ownership funds.

FIG. 3 illustrates an example of a monthly statement 300 provided to an owner reflecting both debits and credits against ownership funds based on both personal and proportional allocations of expense. In this example, Alice is charged for her calculated fuel cost for her individual trips, plus 60% of the cost of fuel during rentals and 60% of the maintenance costs. Against these expenses, the system credits her for 60% of the revenue for renting of the vehicle, plus the full amount of the costs she paid (including the oil change). The month of August reflects a positive balance of $1204.47, which in some implementations may be transferred to an account owned by Alice.

In some implementations, certain expenses may be paid through the joint account rather than paid by an individual and then credited. For example, the management system in communication with the autonomous vehicle may be able to arrange for repair or maintenance services to be performed without the presence of an owner, and the fees for the services are disbursed directly from the account. Similarly, insurance or registration fees for the vehicle may be paid directly from the account rather than by a particular owner. Any such expenses would appear as proportional debits on owners' monthly statements, similar to those shown in FIG. 3, but would not then also appear as credits on any user's statement.

As a further refinement of the automatic paying of expenses, in some implementations, the system may automatically withhold a portion of the revenue earned from rental activities in order to cover projected expenses. This is in contrast to automatically paying the full balance of the earned income each period. Such projected saving would help reduce the possibility of users having to pay into the account to cover a shortfall when the projected expenses come due. Anything that could be paid automatically through the joint ownership account, from parking space rental to insurance to maintenance, could be included in this projected amount.

In some implementations, relative vehicle ownership interest may also be used to resolve priority when multiple owners request the vehicle for overlapping periods. In the given example, trip requests by Alice may normally be given priority over Ben or Cecil because of her majority ownership in the vehicle. This priority may not be absolute; trips reserved far enough ahead of time may be "locked in" once other users have an opportunity to submit a competing request and choose not to do so.

Furthermore, priority may in some implementations be based off of existing vehicle usage. For example, the number of hours that each owner has already reserved over the previous and current month may be compared against their relative ownership share to determine relative priority. One formula for a usage and priority score is:

$$S = p/h \qquad (1)$$

where S is the priority score, p is a value from 0 to 100 representing the percentile ownership in the vehicle, and h is the existing number of hours of reservations over the relevant period.

Applying Equation 1 to a particular example, consider if Alice has already reserved 50 hours of time over the relevant period, Ben has reserved 20 hours, and Cecil 15 hours. Using the formula, Alice's priority would be 1.2, Ben's would be 1.5, and Cecil's would be 0.7. Based on these scores, if Alice and Ben each wish to use the vehicle at the same time, the priority goes to Ben.

In some implementations, share size may represent a limit to free vehicle usage. For example, each owner may be capped as to the number of hours that can be reserved, based on ownership interest. The parties may agree, or the system may generate through typical usage, an amount of time per relevant period allocated for owners' use, and each user may be limited to reserving vehicle time equal to their fraction of that allocated time. As an illustrative example, Alice, Ben, and Cecil have agreed to allocate 80 hours a week to use by owners. Based on their 60%, 30%, and 10% ownership interests, Alice would be permitted to reserve up to 48 hours a week, Ben up to 24 hours, and Cecil up to 8 hours.

An owner may, in some implementations, exceed their usage allotment by compensating the other drivers as though they were a ride share customer. Some embodiments of this option may restrict the owner to the same reservation options and priority as a non-owner, so that other owners maintain higher priority for their private usage. Because of the owner's share of revenue, the percentage ownership may act as an effective discount for trips taken in the role of a ride share customer. For example, Ben takes trips in excess of his allotment and is charged $120, of which $100 is revenue (after expenses and fees) to be allocated to the owners. Ben will receive 30% of the revenue, or $30. The net cost to Ben for the ride is thus $90; in some implementations, the system may take this self-payment into account and only charge Ben $90. The $90 may also not be charged directly to Ben for immediate payment, but may be instead deducted as an additional expense on his next invoice for her ownership share of the vehicle.

Figure 4:
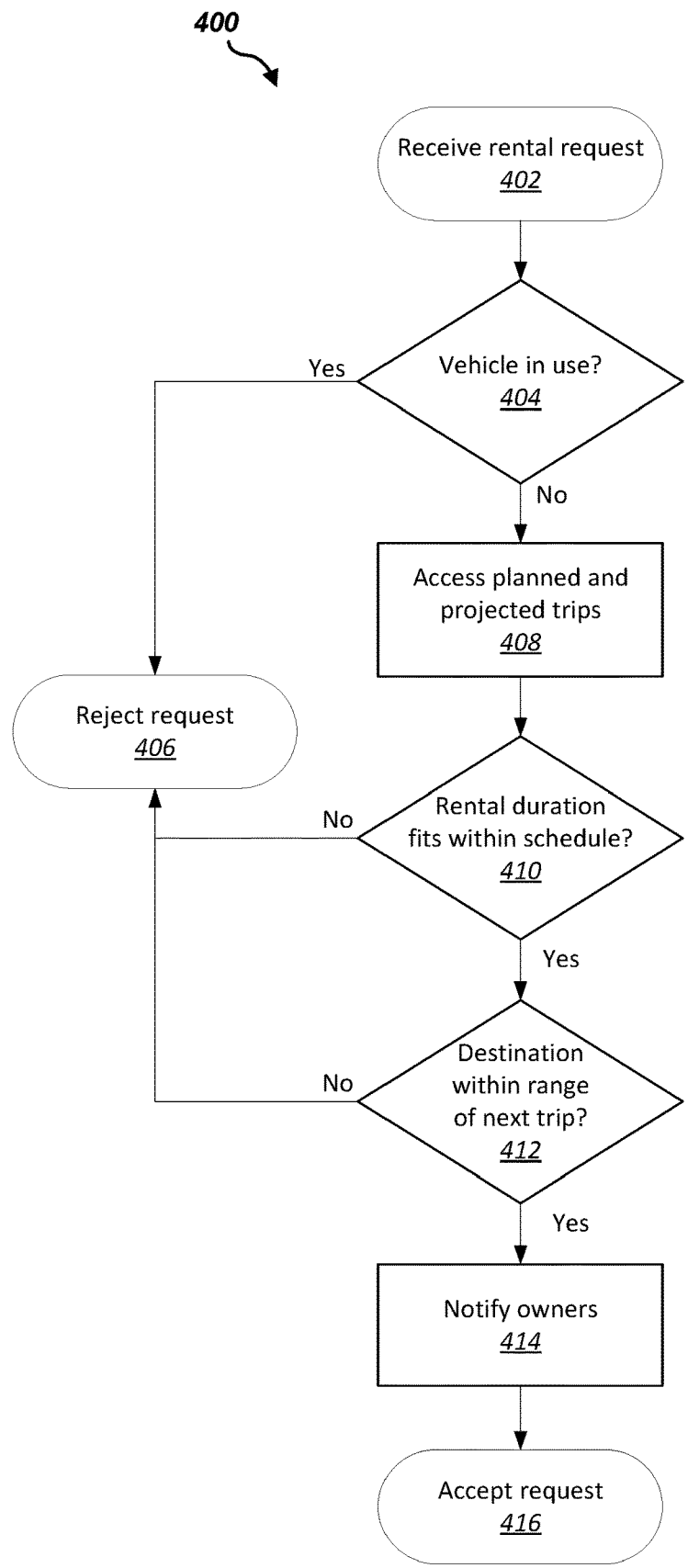
FIG. 4 is a flowchart describing a process for handling a rental request in accordance with one aspect of the present disclosure.

For the system monitoring and managing the use of the vehicle both by the multiple owners and for rental by third parties, a number of factors are taken into account to assure that the vehicle is fairly and efficiently used. FIG. 4 shows a flowchart 400 illustrating one exemplary process that a system may use to determine whether a third party rental request matches the requirements of a particular jointly owned vehicle.

The system receives a rental request to be evaluated for suitability with the jointly-owned vehicle (step 402). While the evaluative process is described as though a single rental request has been made, it will be recognized that the processes described may be adapted to many requests being managed by a larger system, in which optimization of services may include comparing the suitability of requests not only against the constraints of the vehicle management system but also against other requests.

If the request is immediate or in the near future, the system first checks to see that the vehicle is in use (step 404). In some implementations, owners may be able to take and use the vehicle when none of the users have scheduled a trip; if such a trip is in progress, the system rejects the rental request (step 406). Some implementations may allow rental requests further in advance, in which case the system request will be against scheduled and/or predicted usage rather than current usage of the vehicle. The owners may set rules about how far in advance a rental request is accepted, and how to resolve potential conflicts between rental requests for well in advance of a date and subsequent user requests that would be in conflict.

If the vehicle is available, then the system evaluates the planned and projected trips of owners 408. Planned and projected trips may include, in some implementations, not only trips placed on the schedule ahead of time, but also trips that the system determines are likely based on the owners' past behavior. For an example, the system observes that Ben has always taken an unplanned trip to a local bar when a particular sports team wins a game. Noting that a game is scheduled for later in the evening and that the team is projected to win, the system tentatively marks an evening trip from home to the bar, and a later trip back home, as projected trips for that day.

The requested rental is then checked to see if it fits within the existing schedule of owner trips (step 410). If not, then the request is rejected. In some implementations, the system can provide either the rental requestor or the owner whose trip has blocked the rental with the option of modifying their use of the vehicle to accommodate the other. For example, a rental request may result in the vehicle not being present to pick up Alice until 6:15 when she usually leaves the office at 6 pm. Alice is informed of this and chooses to allow the rental, spending an extra fifteen minutes at work.

In addition to the rental duration, the location of the rental destination may affect its suitability in some cases (step 412). For example, a trip that takes the vehicle far away from the owners' home area when the next scheduled trips are at home may not be an efficient use of the vehicle, particularly if the rental trip's destination point is unlikely to have fare opportunities back to the owners' home area. In some implementations, these distance restrictions may be automated based on scheduling and risk-reward optimization for rentals. In some implementations, the owners may set distance and trip length limitations based on their preferences for the availability of the vehicle. For example, the users could determine that the vehicle should never leave the greater metropolitan area for rentals without specific owner authorization, even if the schedule would allow it (such as overnight when no owner trips are planned for several hours).

Additional constraints may also affect the suitability of the vehicle for different rental requests. For example, in some embodiments, the vehicle may include one or more locked compartments that can be made available to passengers or instead may be secured from passengers. A trunk area, glove compartment, console, luggage compartment, or other space may be controlled either manually or automatically by the vehicle owners. Rental requests can include the quantity and size of possessions that must ride in addition to the passengers. If the owners have determined—either as general policy, or due to a specific scheduled need—that a compartment is not available to customers, then rental requests requiring luggage space in excess to what is made available can be rejected as not meeting the constraints of the vehicle.

If the rental request fits the system's identified constraints, then the owners are notified (step 414). Alert frequency may be set according to the preference of each owner and the nature of the rental and surrounding planned trips. For example, an owner can choose to only receive notifications the first time that a rental occurs but not for subsequent rentals occurring in the same series. An owner may choose to receive notifications happening within a certain duration of a planned trip by that owner, such as within an hour of the trip. Each owner can choose any notification method known in the art: an SMS or instant message, an email, an in-app notification, or the like.

Having notified the owners, the system accepts the request (step 416), and navigates the vehicle to the rental departure point at the appropriate time. In some implementations, the rental may be selected at least in part because an existing parking or standing spot for the vehicle is an appropriate departure point, and the vehicle is not required to move before receiving a rental passenger. In some implementations, the fee associated with the rental may be taken at the time that the system commits the vehicle to the trip.

FIG. 5 illustrates a sample schedule 500 representing four days of vehicle trips and illustrating the use of the vehicle by owners and for rental revenue. As shown, at the beginning of each day, the vehicle is available for rentals within a defined distance from the home location. This is because the first scheduled trip each day departs from home.

On Sunday, Alice has planned to take a trip to the Pancake Palace for brunch, and the vehicle will wait for her until she is ready to return home. Depending on Alice's flexibility and the vehicle's settings, it may be made available only for short trips (fifteen minutes or less, for example) so that Alice will not have to wait long for the vehicle whenever she is ready to go.

The vehicle is free to take rentals near the home for most of the day Sunday, until Cecil's weekly grocery trip. While Cecil is shopping, the vehicle may again be made available on a constrained basis. Cecil also may have placed a "hard stop" on rental trips after a certain time, to assure that the vehicle is immediately available when he exits the grocery store laden with purchases.

Once Cecil returns home and unloads his purchases, the vehicle is made available for rental, eventually selecting trips that place it in the vicinity of the airport. The vehicle is waiting at the airport at the time that Ben's plane lands there and so is immediately available for Ben to take home.

The next morning, and on each weekday, Alice takes the vehicle to work downtown. The system accepts rental requests for downtown trips during the day on Monday and Tuesday. On Wednesday, the system navigates the vehicle for a scheduled service appointment uptown, and then accepts rental requests there. On all three days, the vehicle is available to take Alice home from work in the afternoon.

On Monday evening, Ben has a club meeting in Midtown and allows the system to rent the vehicle in that area until he is ready to come home. On Wednesday, Alice, home from work, hands the vehicle off to Cecil to take to dinner at the Kale Buffet. When he returns home, Alice then takes the vehicle out to downtown for an evening event. The vehicle takes rental requests downtown until Alice needs it to return home.

In this illustration, at least half of the vehicle's time and mileage on any given day is spent generating revenue for the owners, which is a significant increase in efficiency and value over a vehicle spending most of its time parked when not being used.

The data structures and code, in which the present disclosure can be implemented, can typically be stored on a non-transitory computer-readable storage medium. The storage can be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the disclosure can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described can be included in hardware components. For example, the hardware components can include, but are not limited to, application-specific integrated circuit (ASIC) chips, field-programmable gate arrays (FPGAs), and other programmable-logic devices now known or later developed. When the hardware components are activated, the hardware components perform the methods and processes included within the hardware components.

The technology described herein can be implemented as logical operations and/or components. The logical operations can be implemented as a sequence of processor-implemented executed blocks and as interconnected machine or circuit components. Likewise, the descriptions of various components can be provided in terms of operations executed or effected by the components. The resulting implementation is a matter of choice, dependent on the performance requirements of the underlying system implementing the described technology. Accordingly, the logical operations making up the embodiment of the technology described herein are referred to variously as operations, blocks, objects, or components. It should be understood that logical operations can be performed in any order, unless explicitly claimed otherwise or a specific order is inherently necessitated by the claim language.

Various embodiments of the present disclosure can be programmed using an object-oriented programming language, such as SmallTalk, Java, C++, Ada or C#. Other object-oriented programming languages can also be used. Alternatively, functional, scripting, and/or logical programming languages can be used. Various aspects of this disclosure can be implemented in a non-programmed environment, for example, documents created in HTML, XML, or other format that, when viewed in a window of a browser program, render aspects of a GUI or perform other functions. Various aspects of the disclosure can be implemented as programmed or non-programmed elements, or any combination thereof.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A computer-implemented method, comprising:
in a system comprising a memory to store computer-executable instructions and a processor to execute the computer-executable instructions:
   allocating fractional ownership interests of an autonomous vehicle to each of a plurality of owners;
   receiving a rental request from a third party;
   determining an availability of the autonomous vehicle for rental based on the received rental request;
   managing the rental of the autonomous vehicle by the third party based on the determined availability, the rental including the system controlling navigation of the autonomous vehicle to a destination specified in the rental request, and the third party providing payment for the rental;
   allocating the provided payment amongst the plurality of owners based on the fractional ownership interests;
   receiving requests for usage of the autonomous vehicle from the plurality of owners at the same time;
   assigning a priority to each of the requests from the plurality of owners based on a ratio of:
      a fractional ownership interest of a respective owner of the plurality of owners, and
      a duration of vehicle usage of the respective owner over a time period; and
   controlling, by the system, the navigation of the autonomous vehicle for use by one of the plurality of owners based on the assigned priority.

2. The method of claim 1, further comprising:
identifying an expense associated with the autonomous vehicle; and
allocating the expense amongst the plurality of owners based on the fractional ownership interests.

3. The method of claim 1, further comprising:
determining that the received rental request is from a first owner of the plurality of owners, wherein the received rental request is for a rental ride of the autonomous vehicle by the first owner; and
providing a discount on a rent amount payable by the first owner for the rental ride of the autonomous vehicle, wherein an amount of the discount corresponds to the fractional ownership interest of the first owner.

4. The method of claim 1, further comprising:
determining that a user has performed a maintenance task on the autonomous vehicle; and providing a usage benefit associated with the autonomous vehicle to the user based on the determination that the user has performed the maintenance task.

5. The method of claim 1, further comprising:
tracking the usage of the autonomous vehicle by each of the plurality of owners;
identifying an expense associated with the autonomous vehicle; and
allocating the expense amongst the plurality of owners based on the tracked usage of the autonomous vehicle.

6. The method of claim 5, wherein the expense is an amount of fuel consumed for operating the autonomous vehicle.

7. The method of claim 1, wherein
the rental request includes a time and the destination, and
determining the availability of the autonomous vehicle for the rental further comprises:
comparing the rental request and scheduled usage of the autonomous vehicle by the plurality of owners;
determining that the time of the rental request for the rental does not conflict with the scheduled usage; and
determining that the destination of the rental request for the rental allows a sufficient time for the autonomous vehicle to travel from the destination to carry out the scheduled usage.

8. The method of claim 1, wherein the fractional ownership interest of a first owner of the plurality of owners is greater than the fractional ownership interest of a second owner of the plurality of owners.

9. The method of claim 8, further comprising:
collecting from the first owner a larger portion of an expense associated with the autonomous vehicle than the second owner based on a greater fractional ownership interest of the first owner; and
allocating to the first owner a larger portion of the provided payment than the second owner based on the greater fractional ownership interest of the first owner.

10. The method of claim 1, further comprising:
determining one or more projected trips of at least one owner of the plurality of owners based on a past behavior of the at least one owner; and
managing the rental of the autonomous vehicle by the third party based on the determined availability and the one or more projected trips.

11. The method of claim 1, further comprising:
determining an amount of fuel that is consumed at a time interval of the rental; and
allocating an expense of the determined amount among the plurality of owners based on the fractional ownership interests.

12. The method of claim 1, further comprising:
determining whether the received rental request satisfies a predetermined constraint based on the availability of the autonomous vehicle, wherein
the predetermined constraint is based on controlled access to a specific area of the autonomous vehicle; and
rejecting the rental request based on the determination that the received rental request does not satisfy the predetermined constraint.

13. The method of claim 1, further comprising:
withholding a portion of the provided payment based on projected expenses; and
controlling payment of a maintenance task from the withheld portion of the provided payment.

* * * * *